Aug. 17, 1954

R. F. ARNOLDY 2,686,364

WEIGHTED GRASS EDGER

Filed Oct. 25, 1951

INVENTOR.
ROMAN F. ARNOLDY
BY
Lester B. Clark.
ATTORNEY

Patented Aug. 17, 1954

2,686,364

UNITED STATES PATENT OFFICE 2,686,364

WEIGHTED GRASS EDGER

Roman F. Arnoldy, Houston, Tex.

Application October 25, 1951, Serial No. 253,017

4 Claims. (Cl. 30—292)

The present invention relates to a St. Augustine grass edger and embodies a particular type of construction which has been found in actual practice to be of advantage, first, because it is a weighted edger and causes the knife cutter blade of the rotary type to cut into the turf due to the weight of the rollers, and the position of this cutter blade is adjusted by raising and lowering of the handle.

With the usual type of lawn edger the operator is compelled to force the edger along under considerable pressure so as to cause the blade to cut into the turf to perform the edging operation, and it is necessary, therefore, that a considerable force be exerted on the edger.

The present edger is of a type wherein the weight is provided by weighted rollers or drums placed on an axle and directly above the rotary knife edge so that the weight of these drums tends to force the knife blade into the turf and perform the cutting operation so that it is only necessary to apply the forward motion in order to carry the knife blade along and cause the edger to perform a neat and workmanlike operation.

Another object of the invention is to provide a weighted structure so that it will be positioned slightly ahead of the penetrating portion of the cutting knife blade and of its own weight to cause the rollers to advance when assisted by only a slight amount of a forward thrust.

Another object of the invention is to provide an axle on which the cutter blade is affixed as well as the handle so that the position of the blade may be varied by raising and lowering the handle so as to determine the percentage of the weight which will be applied ahead of the contacting edge of the cutting blade.

Another object of the invention is to mount the hollow weighted drums rotatably upon the axle so that the weight of the water or other material used in the drums will be available not only to force the cutting blade into position, but also will tend to create a forward motion of the edger as the cutting operation is performed.

A still further object of the invention is to have a rigid connection between the handle and the cutter so that the operator by raising and lowering of the handle may adjust the position of the cutter so as to determine the advancement of the edger with respect to the turf being cut.

Still another object of the invention is to mount the cutting blade upon a rigid arm or bracket made up of a couple of spaced pieces of metal which will be affixed to the transverse axle of the device so as to make it possible to adjust the handle and control the cutting action of the blade when the weight of the drums is considered.

Other and further objects of the invention will be readily apparent when the following description is considered in connection with the accompanying drawings wherein.

Figure 1:
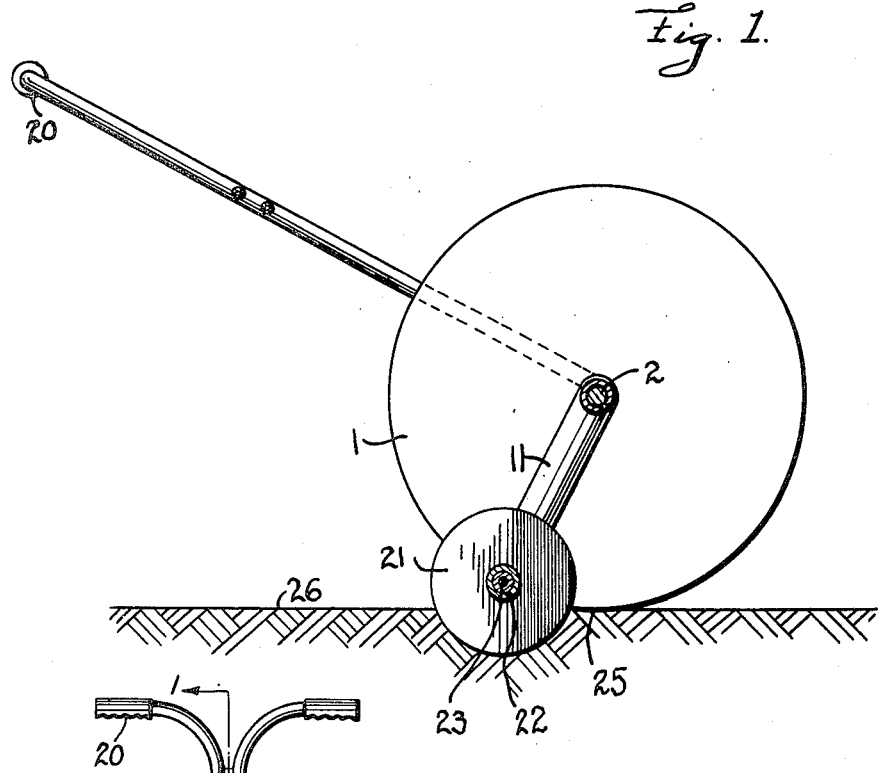
Figure 1 is a cross-section taken along line 1—1 of Fig. 2 of the Augustine grass edger with cutter blade in position and the handle ready to apply a forward thrust in addition to that furnished by weighted drums.
Figure 2:
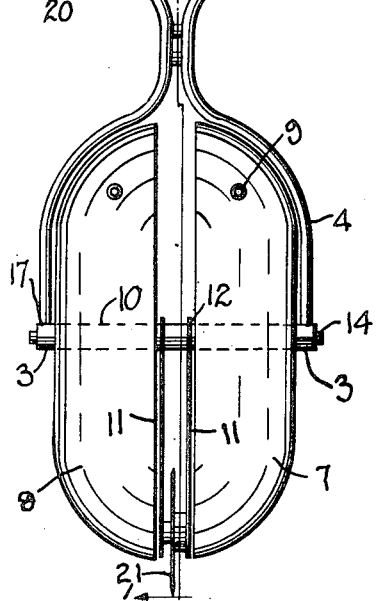
Figure 2 is a view showing the handle and blade and a rear elevation of the weighted drums to which the thrust will be applied by applying a forward force upon the handle of the device.

In Figure 1 the lawn edger is indicated generally by the numeral 1 and is made up of the axle 2 which extends transversely through the device as seen in Figure 2. Affixed on the outer ends of this axle will be the trunnion bearings 3 as seen in Figure 2 and these trunnion bearings are in turn carried by a yoke 4 which straddles the weighted members 7 and 8, two of which are applied.

These weighted members are drums which are made hollow and may be filled through the plug 9, but are intended to contain a liquid such as water or any other material which fills the device. These rotatable half drums are rotatably disposed at 10 upon the transverse axle so that they may rotate independently of the arm or bracket 11 which is fixed at 12 upon the axle. The axle may be rotatable upon crossed shaft 14, but preferably the hollow axle 17 will be affixed as described to the trunnions 3 and to the bracket 11 so that raising and lowering of the handle 20 will tend to raise and lower the arm or bracket 11, and to also raise and lower the cutter blade 21 which is rotatable at 22 upon a shaft 23 between the two brackets 11 on the device.

It seems apparent that as an operator applies a forward thrust to the handle 20 that the fact that the drums 7 and 8 may be weighted such as being filled with water, the weight will naturally rest at 25 upon the ground, but the fact that the cutter blade 21 is in turn placed to the rear of the center of gravity of the weight will tend to force the cutter blade 21 into the ground. Any resistance to the entry of the blade into the ground will in turn cause the weighted drums 7 and 8 to move forwardly of the turf or lawn 26. It seems apparent from the foregoing that the only thrust required to move the edger forward will be in addition to the weight of the drums and this in turn will be assisted by the knife blade 21 being forced into the ground.

As is well known it is obvious that a considerable thrust must be applied in a forward direction with the ordinary cutter because it does not have any particular weight tending to force the cutter blade into the ground, whereas with this particular edger the weight not only tends to force the cutter blade into the turf 26 but this thrust in turn tends to move the edger in a forward direction. It seems very obvious that when the turf is particularly hard or tough the handle 20 may be raised so as to move the blade 21 to the rear of the axle 2 so that there will be a greater tendency for the weighted drums 7 and 8 to travel forwardly along the surface of the turf.

The edger may be tilted at a slight angle so that the cutter slants toward the concrete and it will automatically steer itself and not veer away so that high speed operation is possible and the operator merely assumes a suitable stance.

A straight line by the St. Augustine edger is thus possible, because it may be leaned to follow the line desired. As constant rubbing action against the concrete or edge is possible, such action tends to constantly sharpen the cutter blades against the concrete.

What is claimed is:

1. A lawn edger, comprising, an axle, a pair of weighted rollers spaced apart on said axle and rollable thereon, an arm fixedly attached to said axle and extending rearwardly therefrom between the rollers, a disk-shaped cutter rollably mounted on the outer end of said arm to project beneath the rollers, and an operating handle fixedly attached to said axle to extend rearwardly therefrom at an angle to said arm.

2. A lawn edger according to claim 1, wherein said rollers are hollow and adapted to contain a weighting fluid.

3. A lawn edger according to claim 1, wherein the rims of said rollers are of convex curvature.

4. A lawn edger according to claim 1, wherein said operating handle includes a U-shaped yoke having its ends affixed to the opposite ends of said axle projecting from the opposite outer ends of said rollers.

References Cited in the file of this patent

UNITED STATES PATENTS

| Number | Name | Date |
|---|---|---|
| 953,771 | Wilder | Apr. 5, 1910 |
| 1,189,168 | Parsons | June 27, 1916 |
| 1,796,606 | McBride et al. | Mar. 17, 1931 |
| 2,241,744 | Schulz | May 13, 1941 |

FOREIGN PATENTS

| Number | Country | Date |
|---|---|---|
| 9,275 | Great Britain | June 2, 1891 |